Dec. 18, 1945.  C. R. McWHORTER  2,391,257
CENTER OF GRAVITY LOCATION INDICATOR
Filed June 23, 1943
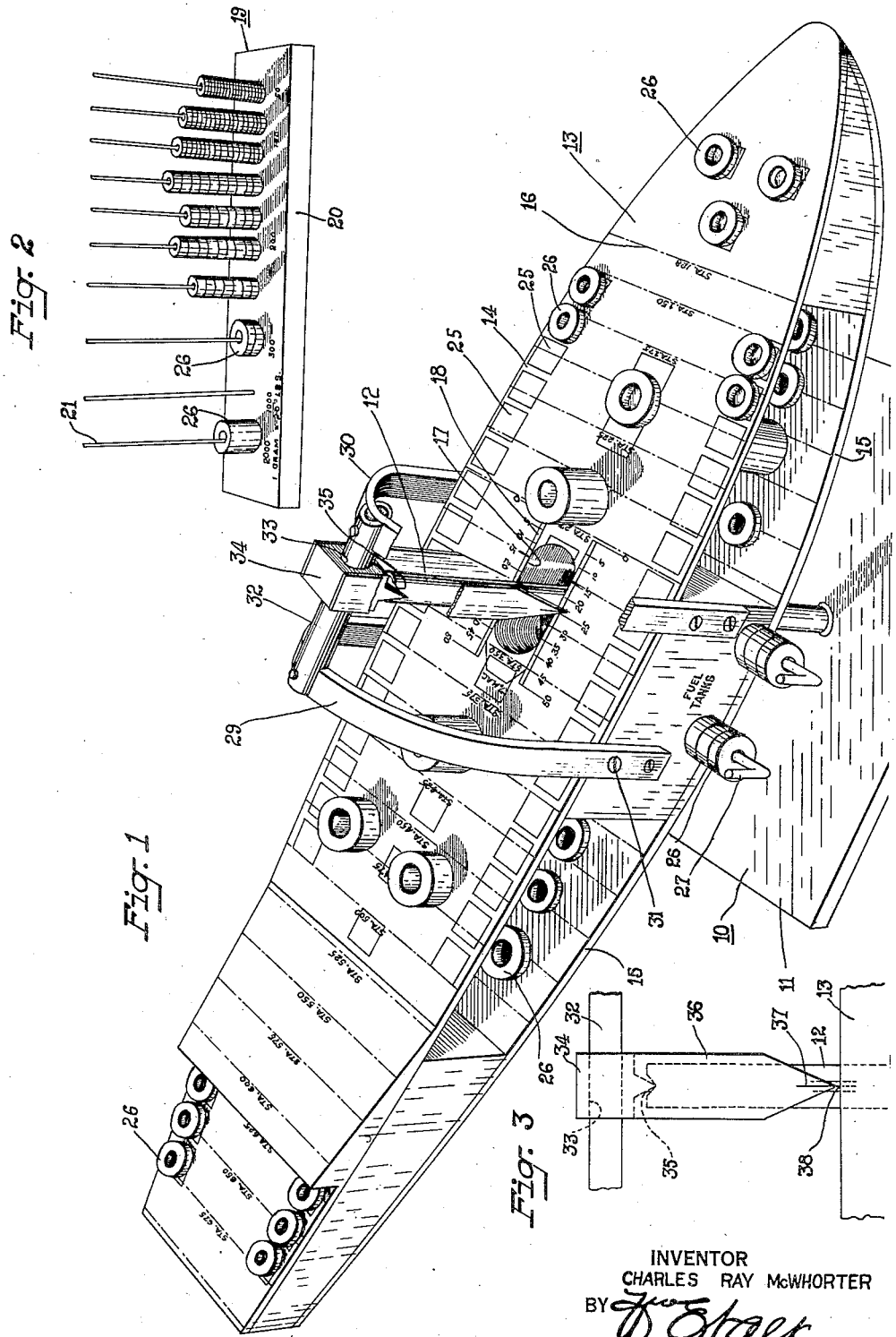
INVENTOR
CHARLES RAY McWHORTER
BY
ATTORNEY Patented Dec. 18, 1945

2,391,257

UNITED STATES PATENT OFFICE 2,391,257

CENTER OF GRAVITY LOCATION INDICATOR

Charles Ray McWhorter, Ferguson, Mo., assignor to Curtiss-Wright Corporation, a corporation of Delaware Application June 23, 1943, Serial No. 492,174

3 Claims. (Cl. 235—61)

This invention relates to balance indicators, and more particularly to a type of indicator, which may be termed a gravitometer, for predetermining the location of the center of gravity of an airplane under different desired loading conditions.

It is an object of the present invention to provide a device whereby the center of gravity of a given airplane can be quickly determined for the different loading conditions of an airplane without the use of mathematical equations and charts which are customarily used for this purpose.

According to the present invention, there has been provided a model structure of an airplane of proportionate center of gravity and weight and on which there is provided space locations similar to the cargo and passenger space locations on an airplane, for receiving proportionate weights corresponding to cargo and personnel which is desired to be put into the airplane. On the model structure is a scale graduated in terms of percent of the mean aerodynamic chord within a certain range representative of the permissible shifting of the center of gravity on which the airplane is known to fly and the loading must be such that when the model structure is balanced on a fulcrum support, a pointer will register somewhere within this range. The model structure is first loaded with the proportionate weights and tested for balance on the fulcrum support. With respect to the fulcrum point, the model structure can be adjusted longitudinally to locate the pointer in the proper position with respect to an index on the fulcrum support. If the same pointer, after the loaded model structure is adjusted to balance it, points to a location on the percent scale outside of the permitted range of center of gravity, the person making the test will be informed of an improper loading for the airplane. Rearrangement of the loading must then take place and continue to take place until such time as the pointer, in its balanced position, will lie within the certain range on the scale.

For other objects and for a better understanding of the invention, reference may now be had to the following detailed description taken in connection with the accompanying drawing, in which Fig. 1 is a perspective view of the gravitometer in its set up position.

Fig. 2 is a perspective view of a rack on which the proportionate weights are stored when not being used on the model structure.

Fig. 3 is an enlarged fragmentary view of the connection of the model structure to the fulcrum support and of the pointer associated therewith.

Referring now to the figures, there is shown a fulcrum support 10 having a base 11 and an upwardly extending rod or pedestal 12. The base 11 is positioned on a table or at any place which is level and firm so that the apparatus will be properly steadied. On this fulcrum support there is adapted to be disposed a model structure 13 fashioned to have three dimensions in a manner similar to that of the airplane whose center of gravity it is desired to locate for different loading conditions. The model structure is constructed of any suitable material and may or may not be exactly dimensionally proportionate to the actual airplane. The important requirement is that the weight and initial location of the center of gravity be made as nearly exact in proportion to the same values of the actual airplane. The particular model structure has two floors 14 and 15 corresponding to a cargo airplane of a type having both upper and lower cargo spaces. On each of the floors the cargo and personnel station points throughout the extent of the airplane are marked, one example of which being shown at 16.

Within the region of the center of gravity of the model structure, there is an elongated opening 17 extending from the top to the bottom of the same and along which there is disposed an index scale 18 corresponding to and in similar location to the mean aerodynamic chord of the particular airplane being examined. Marked on this scale are percentages ranging from zero to 50, the zero location being at the forward point of this chord while the 50 location being one-half the length of the chord. For the present airplane it is known that the center of gravity must lie within 20 to 30 percent of the mean aerodynamic chord of the airplane.

Along with this apparatus, Fig. 2, there is provided a set 19 of weights varying in size and proportioned so that one gram is equivalent to 20 pounds of cargo or personnel. This set of weights 19 includes a base 20 with a series of vertically extending pins 21 on which sets of different sizes of the weights may be respectively located thereon when they are not being used on the model structure. When these weights are used from the set 19, they are disposed at different stations on the platforms 14 and 15. The weight of the cargo pieces or parcels is usually known and there is selected a weight 26 corresponding to the weight of the cargo piece. This particular airplane has a row of seat locations 25 in which the personnel may be located. For each member of the personnel there may be disposed in the seat locations 25, a weight 26. Other weights 26 may be located at the nose of the model structure to represent the operating personnel or crew of the airplane. Extending laterally from the sides of the model structure are hooks 27 on which weights 26 are disposed corresponding in amount to the weight of fuel being carried by the airplane. These hooks 27 are substantially the exact location of the fuel tanks in the wings of the actual airplane.

Extended over the top of the model structure are two downwardly extending bails 29 and 30, the free ends of which are connected by screws 31 to the sides of the model structure. Extending between the upper parts of the bail is a rod 32 which is adjustably slidable through an opening 33 in a knife-edge part 34. The knife-edge part 34, when the model structure is set down over the pedestal 12 so that it extends through the elongated opening 17, is pivoted in a knife-edge receiving slot 35 on the upper end thereof.

Fixed to the knife-edge 34 is a downwardly extending pointer 36 having an index line 37 adapted to register with an index line 38 on the pedestal 12 when the entire structure is in perfect balance. If for a given loading and after the model structure has been placed on the pedestal, the same is found to be out of balance, an adjustment is made of the connecting means 32 through the knife-edge opening 33. This is done until the model structure is put into a perfect balance as indicated by the index line 37 lining up with the index line 38 on the pedestal 12.

If, after this adjustment has been made, the pointer 36 is within 20 to 30 percent locations of the scale, the airplane is regarded to be satisfactorily loaded and will be safe to fly under these loading conditions. If the indicator 36 is outside of this range, a readjustment of the weights on the model structure must be made and the model be re-tested to bring the pointer 36 within the range of the scale.

It should now be apparent that there has been provided an arrangement whereby the loading conditions of an airplane can be predetermined for the proper center of gravity location without the necessity of difficult mathematics and reading of charts.

While various changes may be made in the detail construction of the arrangement, it shall be understood that such changes shall be within the spirit and scope of the present invention as defined by the appended claims.

I claim as my invention:

1. In a balance indicator, a model structure of proportionate weight and center of gravity location of an actual airplane to be loaded with cargo and personnel, said model structure being of three dimensions and having an opening extending therethrough from the top to the bottom thereof in the region of the permissible center of gravity location therefor, a fulcrum support extending through the opening, knife-edge means adapted to be pivoted on the extended end of the fulcrum support, means for securing the model structure to the knife-edge means for longitudinal adjustment with respect thereto, indicia means on the model structure adjacent the opening defining the range within which the center of gravity must lie for a given loading, proportionate weights representative of the cargo and personnel adapted to be stationed on the model structure to simulate a desired loading condition for the airplane, and a pointer on the knife-edge means adapted to register with the indicia means.

2. In a balance indicator, a model structure of proportionate weight and center of gravity location of an actual airplane to be loaded with cargo, said model structure having station locations indicated thereon and being formed with an opening extending therethrough from top to bottom in the region of the center of gravity, a support extending through said opening, means for balancing said model structure on said support, proportionate weights representative of cargo which are adapted to be temporarily disposed on said model structure at certain of said stations and which may unbalance said model structure, means for bodily adjusting said model structure with respect to said support to compensate for any unbalance caused by said weights, and means actuated by such adjustment for indicating the location of the center of gravity of said model structure, and hence of said airplane, for the particular loading represented by said weights.

3. In a balance indicator, a model structure which has a weight and a center of gravity location proportionate to an actual vehicle to be loaded, said model structure being formed with an opening extending therethrough in the region of its center of gravity and having a center of gravity scale thereon adjacent said opening, which scale is of an extent to include the predetermined safe range of shift of the center of gravity, a support member for said model structure extending through said opening and having an indicia thereon by which the balance point for said model structure may be found, relatively slidable cooperating means for adjustably pivotally mounting said model structure on said support member, proportionate weights representative of load which are adapted to be disposed temporarily on said model structure and which may unbalance the same, and a pointer element cooperating with said center of gravity scale and said balance point indicia for indicating the center of gravity of said representatively loaded model structure when said pointer and indicia are brought into registry by adjusting said model structure through said means.

CHARLES RAY McWHORTER.